United States Patent
Jacobson et al.

(10) Patent No.: US 11,063,435 B2
(45) Date of Patent: Jul. 13, 2021

(54) ENERGY-BASED ADAPTIVE STABILITY CONTROL SYSTEM

(71) Applicants: RAYTHEON COMPANY, Waltham, MA (US); UTAH STATE UNIVERSITY, Logan, UT (US)

(72) Inventors: Boris S. Jacobson, Westford, MA (US); David H. Altman, Framingham, MA (US); Charles P. Scheffler, Milford, MA (US); Regan A. Zane, Hyde Park, UT (US)

(73) Assignees: RAYTHEON COMPANY, Waltham, MA (US); UTAH STATE UNIVERSITY, Logan, UT (US)

(*) Notice: Subject to any disclaimer, the term of this patent is extended or adjusted under 35 U.S.C. 154(b) by 305 days.

(21) Appl. No.: 16/057,222

(22) Filed: Aug. 7, 2018

(65) Prior Publication Data
US 2019/0044340 A1    Feb. 7, 2019

Related U.S. Application Data

(60) Provisional application No. 62/542,019, filed on Aug. 7, 2017.

(51) Int. Cl.
*H02J 3/38*     (2006.01)
*G05B 19/042*   (2006.01)
(Continued)

(52) U.S. Cl.
CPC ............ *H02J 3/381* (2013.01); *G05B 19/042* (2013.01); *H02J 3/24* (2013.01); *G05B 2219/2639* (2013.01); *H02J 3/28* (2013.01)

(58) Field of Classification Search
CPC ...... H02J 3/381; H02J 3/24; H02J 3/28; H02J 2310/42; G05B 19/042; G05B 2219/2639
See application file for complete search history.

(56) References Cited

U.S. PATENT DOCUMENTS

| 4,974,140 A | 11/1990 | Iba et al. |
| 6,122,572 A | 9/2000 | Yavnai |

(Continued)

FOREIGN PATENT DOCUMENTS

| CN | 1954280 A | 4/2007 |
| WO | 2011044624 A1 | 4/2011 |

(Continued)

OTHER PUBLICATIONS

Balog et al., "The Load as an Energy Asset in a Distrubuted DC SmartGrid Architecture," IEEE Transactions on SMart Grid, vol. 3, No. 1, Mar. 2012, pp. 253-260.

(Continued)

*Primary Examiner* — Thomas C Lee
*Assistant Examiner* — Charles Cai
(74) *Attorney, Agent, or Firm* — Cantor Colburn LLP

(57) ABSTRACT

An adaptive stability control system includes a direct current (DC) bus and one or more distributed controllers. The DC bus is configured to provide bidirectional pulsed power flow and energy storage. The distributed controller is configured to continuously measure an impedance of the DC bus and execute at least one adaptive control algorithm to regulate impedance of the DC bus to maintain stability of the bidirectional pulsed power flow and energy storage.

17 Claims, 11 Drawing Sheets

(51) Int. Cl.
*H02J 3/24* (2006.01)
*H02J 3/28* (2006.01)

(56) References Cited

U.S. PATENT DOCUMENTS

| | | | |
|---|---|---|---|
| 7,145,072 | B1 | 12/2006 | Hirschmann, Jr. et al. |
| 7,508,224 | B2 | 3/2009 | Williams |
| 7,580,819 | B2 | 8/2009 | De et al. |
| 7,966,101 | B2 | 6/2011 | Mitani et al. |
| 7,982,442 | B2 | 7/2011 | Solyom et al. |
| 8,046,320 | B2 | 10/2011 | De |
| 8,319,136 | B2 | 11/2012 | Byron et al. |
| 8,441,151 | B2 | 5/2013 | Huang |
| 9,471,731 | B2 | 10/2016 | Fu et al. |
| 9,590,524 | B1 | 3/2017 | Jacobson |
| 2005/0197991 | A1 | 9/2005 | Wray et al. |
| 2011/0019444 | A1 | 1/2011 | Dargatz et al. |
| 2013/0076332 | A1 | 3/2013 | Burgos et al. |
| 2013/0099800 | A1 | 4/2013 | Francis et al. |
| 2014/0032148 | A1 | 1/2014 | Verhulst et al. |
| 2015/0019175 | A1 | 1/2015 | Karimi et al. |
| 2015/0244160 | A1 | 8/2015 | Schweitzer, III et al. |
| 2015/0311815 | A1 | 10/2015 | Nedic et al. |
| 2016/0126843 | A1* | 5/2016 | Kelly .............. H02M 7/17 323/271 |
| 2016/0149404 | A1* | 5/2016 | Karimi .............. H02J 1/102 307/9.1 |
| 2016/0274947 | A1* | 9/2016 | Miyamori ............ G10L 15/34 |
| 2016/0276821 | A1 | 9/2016 | Politis et al. |
| 2017/0070043 | A1 | 3/2017 | Smith et al. |
| 2017/0155272 | A1* | 6/2017 | Kim .............. H02J 7/025 |
| 2019/0229609 | A1* | 7/2019 | Li .............. H02M 7/4826 |
| 2020/0110115 | A1* | 4/2020 | Baone .............. G01R 21/1331 |

FOREIGN PATENT DOCUMENTS

| | | |
|---|---|---|
| WO | 2013078234 A1 | 5/2013 |
| WO | 2015127093 A1 | 8/2015 |

OTHER PUBLICATIONS

Dragicevic et al., "Supervisory Control of an Adaptive-Droop Regulated DC Microgrid with Battery Management Capability," IEEE Transactions on Power Electronics, vol. 29, No. 2, Feb. 2014, pp. 695-706.

Magne et al., "Active Stabilization of DC Microgrids Without Remote Sensors for More Electric Aircraft," IEEE Transactions on Industry Applications, vol. 49, No. 5, Sep. 2013, pp. 2352-2360.

Miao et al., "Automated Digital Controller Design for Switching Converters," IEEE 36th Power Electronics Specialists Conference, Jun. 2005, pp. 2729-2735.

Miao et al., "Detection of Instability and Adaptive Compensation of Digitally Controlled Switched-Mode Power Supplies," IEEE Applied Power Electronics Conference and Exposition, vol. 1, Mar. 2005, pp. 63-69.

Miao et al., "System Identification of Power Converters with Digital Control Through Cross-Correlation Methods," IEEE Transactions on Power Electronics, vol. 20, No. 5, Sep. 2005, pp. 1093-1099.

Morroni et al., "Adaptive Tuning of Switched-Mode Power Supplies Operating in Discontinuous and Continuous Conduction Modes," IEEE Transactions on Power Electronics, vol. 24, No. 11, Nov. 2009, pp. 2603-2611.

Morroni et al., "An Online Stability Margin Monitor for Digitally Controlled Switched-Mode Power Supplies," IEEE Transactions on Power Electronics, vol. 24, No. 11, Nov. 2009, pp. 2639-2648.

Morroni et al., "Design and Implementation of an Adaptive Tuning System Based on Desired Phase Margin for Digitally Controlled DC-DC Converters," IEEE Transactions on Power Electronics, vol. 24, No. 2, Feb. 2009, pp. 559-564.

Morroni et al., "Robust Adaptive Tuning of Digitally Controlled Switched-Mode Power Supplies," IEEE Applied Power Electronics Conference and Exposition, Feb. 2009, pp. 240-246.

Seltzer et al., "Gain-Scheduled Control of Multi Angle Phase Shift Modulated Dual Active Bridge Series Resonant DC/DC Converters," IEEE 13th Workshop on Control and Modeling for Power Electronics, Jun. 2012, pp. 1-7.

Seltzer et al., "Multi-Mode Control of Series and Parallel Converters for Bidirectional Power Systems," IEEE 15th Workshop on Control and Modeling for Power Electronics, Jun. 2014, pp. 1-8.

Shirazi et al., "An Autotuning Digital Controller for DC-DC Power Converters Based on Online Frequency-Response Measurement," IEEE Transactions on Power Electronics, vol. 24, No. 11, Nov. 2009, pp. 2578-2588.

Shirazi et al., "Integration of Frequency Response Measurement Capabilities in Digital Controllers for DC-DC Converters," IEEE Transactions on Power Electronics, vol. 23, No. 5, Sep. 2008, pp. 2524-2535.

Thandi et al., "Modeling, Control and Stability Analysis of a PEBB based DC DPS," IEEE Transaction on Power Delivery, vol. 14, No. 2, Apr. 1999, pp. 497-505.

Gab-Su Seo, et al, "Photovoltaic Module-Level DC-DC Converter with Arc Fault Protection Scheme for DC Distribution System", 2013, IEEE. pp. 917-923.

H. Bruce Land and Tammy Gammon, "Addressing Arc-Flash Problems in Low-Voltage Switchboards: A Case Study in Arc Fault Protection", IEEE Transactions on Industry Applications, vol. 51, No. 2, Mar./Apr. 2015, pp. 1897-1908.

H. Bruce Land, et al, "Design of a Sensor to Predict Arcing Faults in Nuclear Switchgear", IEEE Transactions on Nuclear Science, vol. 50, No. 4, Aug. 2003, pp. 1161-1165.

H. Bruce Land, III, Sensing Switchboard Arc Faults, IEEE Power Engineering Review, Apr. 2002, pp. 18-27.

R. Wilkins, M. Allison and M. Lang "Improved Method for Arc Flash Hazard Analysis", IEEE, May 2004, pp. 55-62.

H.B. Land III, "Determination of the Cause of Arcing Faults in Low-Voltage Switchboards", IEEE Transactions on Industry Applications, vol. 44, No. 2, Mar./Apr. 2008., pp. 430-436.

International Search Report and Written Opinion issued in International Application No. PCT/US2020/026999; Application Filing Date Apr. 7, 2020; dated Jun. 26, 2020 (14 pages).

* cited by examiner

ENERGY-BASED ADAPTIVE STABILITY CONTROL SYSTEM

CROSS-REFERENCE TO RELATED APPLICATIONS

This application claims the benefit of U.S. Provisional Application No. 62/542,019 filed Aug. 7, 2017, which is incorporated herein by reference in its entirety.

BACKGROUND

Future sea vessels are being developed that deploy electromagnetic (EM) weapon systems. Medium Voltage Direct Current (MVDC) systems have recently gained interest as an option for enhancing transfer capacity and providing increased power quality in power distribution networks. However, conventional MVDC networks have been incompatible with EM systems due to their inability to ensure stability with bidirectional pulsed power flow and energy storage.

SUMMARY

Various non-limiting embodiments provide an adaptive stability control system including a one or more distributed (local) controllers configured to continuously measure the bus impedance and apply adaptive control algorithms to regulate impedance of the DC bus and maintain stability. In one or more non-limiting embodiments, distributed controllers effectively lower the equivalent source impedance at frequencies where source and load interactions may reduce stability margins according to direction of the energy flow. The distributed controllers can affect the equivalent source impedance by injecting or drawing energy between storage and the bus, and/or by adaptively adjusting parameters of the closed-loop feedback. The adaptive stability control system can be implemented in a medium voltage (MV) bidirectional power distribution system delivering power ranging, for example, from 6 kilovolts (kV) to 18 kV. The adaptive stability control system can also be installed in a sea vessel that employs a Medium Voltage Direct Current (MVDC) Integrated Power and Energy System (IPES).

In at least one embodiment, the adaptive stability control system includes an intelligent controller. The intelligent controller includes hierarchical system controller having multiple levels. Each level includes a plurality of electronic intelligent logic units (referred to as "agents") that execute basic or extended data processing operations. In at least one embodiment, each level includes an electronic hardware processing controller, and each controller comprises several electronic intelligent logic units having delineated responsibilities.

In another non-limiting embodiment, an adaptive stability control system includes controllers capable of performing energy storage. The controllers receive bus impedance specifications and continuously regulate the local bus impedance through adaptive control algorithms. As described herein, the adaptive stability control system can be implemented in a MV bidirectional power distribution system delivering power ranging, for example, from 6 kV to 18 kV. The adaptive stability control system can also be installed in a sea vessel that employs a Medium Voltage Direct Current (MVDC) Integrated Power and Energy System (IPES).

According to a non-limiting embodiment, an adaptive stability control system includes a direct current (DC) bus and one or more distributed controllers. The DC bus is configured to provide bidirectional pulsed power flow and energy storage. The distributed controller is configured to continuously measure an impedance of the DC bus and execute at least one adaptive control algorithm to regulate impedance of the DC bus to maintain stability of the bidirectional pulsed power flow and energy storage.

According to another non-limiting embodiment, a method of regulating power in a distributed power system comprises delivering bidirectional pulsed power flow and energy storage to and from at least one distributed smart converter via a direct current (DC) bus. The method further comprises continuously measuring, via the at least one distributed smart converter, an impedance of the DC bus, and executing, via the at least one distributed smart converter, at least one adaptive control algorithm to regulate the impedance of the DC bus to maintain stability of the bidirectional pulsed power flow and energy storage.

Additional features and advantages are realized through the techniques of the present disclosure. Other non-limiting embodiments are described in detail herein and are considered a part of the claimed inventive teachings. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Conventional approaches attempting to provide systems for driving EW weapons fail to exchange energy storage between various loads in different locations. For instance, at least one conventional approach to achieve bidirectional stability attempts to guarantee the ratio of source to load impedance ($\|T\|$) is much less than 1 at all frequencies and in all conditions. This limitation reduces impedance at bus-to-load interfaces by decoupling loads with large energy storage elements, but requires massive energy storage sized for peak power. In addition, to guarantee $\|T\| \ll 1$ at all frequencies and in all conditions, over-damped EMI filters must be implemented in the system, which are not practical to achieve with commercial off-the-shelf (COTS) parts.

Figure 1:
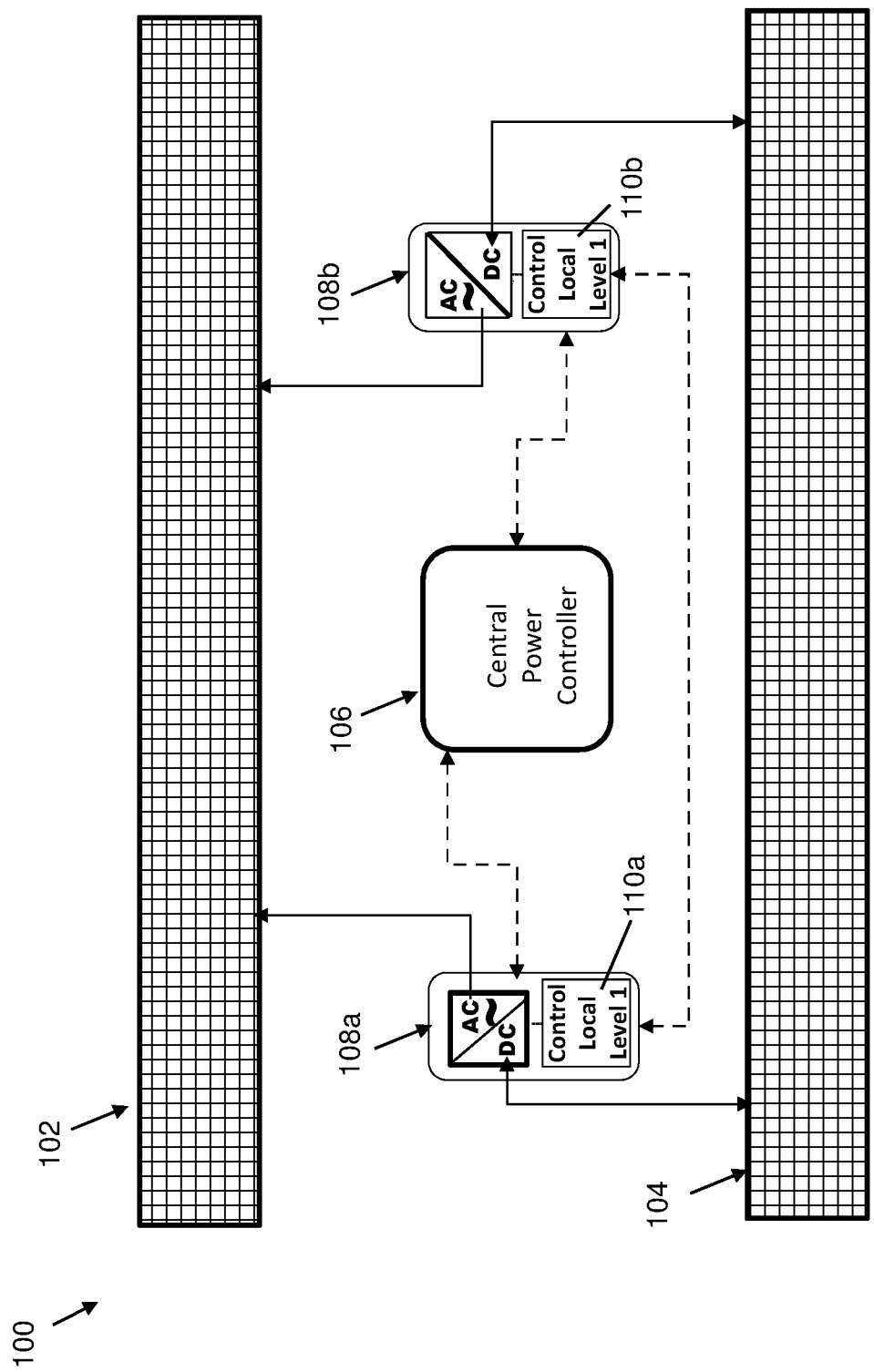
FIG. 1 is block diagram illustrating a power stability system including a PFC AC/DC converter module and an isolated DC/DC converter module.

FIG. 1 is a high-level block diagram of an adaptive stability control system 100 according to a non-limiting embodiment. The adaptive stability control system 100 comprises an alternating current (AC) bus 102, a direct current (DC) bus 104, a central controller 106, and one or more distributed smart converters 108a and 108b.

The AC bus 102 can serve to input AC power to the distributed smart converters 108a and 108b or output AC power to the distributed smart converters 108a and 108b. In other embodiments, the adaptive stability control system 100 can include a first AC bus to input AC power to the distributed smart converters 108a and 108b and a second a AC bus to output AC power from the distributed smart converters 108a and 108b.

The DC bus 104 is configured to provide bidirectional pulsed power flow and energy storage to and from the distributed smart converters 108a and 108b. In one or more embodiments, the DC bus 104 can included different segments for handling different DC power levels. For example, a first segment can be designed to distribute medium voltage DC (MVDC) power, while a second segment can be designed to distribute low voltage DC (LVDC) power.

The central controller 106 is configured to coordinate generation sources and loads to dynamically handle repeated pulse load demands from an arbitrary number of pulse loads. The central controller 106 is also in signal communication with the distributed smart converters 108a and 108b to provide control commands that operate power converters, loads, storage devices and/or power generators, while also obtaining DC bus data such as, for example, continuous DC bus impedance measurements. The impedance of the DC bus can be determined by analyzing the level of voltage across the DC bus along with the level of current input to the DC bus.

The distributed smart converters 108a and 108b are configured to perform power operations including, but not limited to, power conversion, load drive, energy storage and/or power generation. Although two distributed smart converters 108a and 108b are illustrated, it should be appreciated that additional distributed smart converters can be employed in the adaptive stability control system 100. In at least one non-limiting embodiment, the distributed smart converters 108a and 108b include a local controller 110a and 110b. The local controllers 110a and 110b are in signal communication with one another, along with the central controller 106. In this manner, the distributed smart converters 108a and 108b can continuously measure the impedance of the DC bus 104 and execute at least one adaptive control algorithm to regulate the impedance of the DC bus, thereby maintaining stability of the bidirectional pulsed power flow and energy storage. In at least one embodiment, the smart converters 108a and 108b regulate the impedance by aiming to maintain the measured impedance at a target impedance value. In at least one embodiment, the target impedance value may actively vary based on the frequency of the energy flow through the DC bus 104 and/or power requirements of the system. Accordingly, the distributed smart converters 108a and 108b can maintain stability of the DC bus 104 while also providing the ability to operate independently of the central controller 106.

Figure 2B:
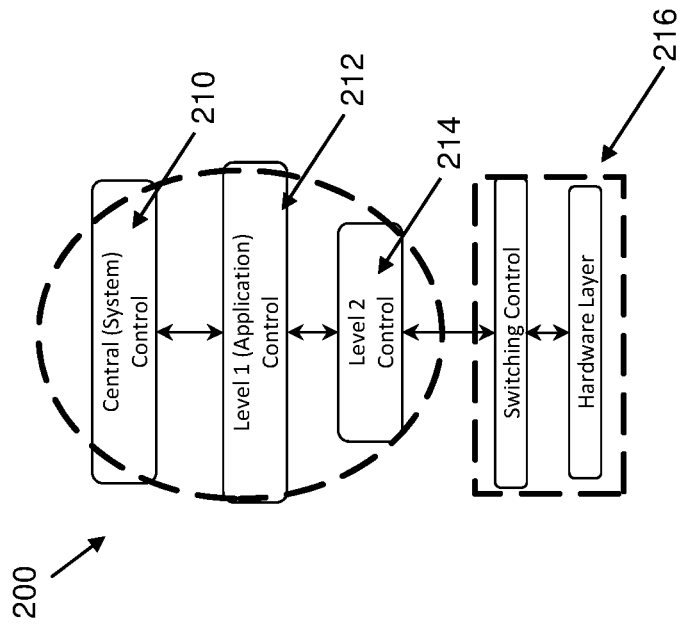
FIG. 2 describes the architecture of a multi-level power controller.
Figure 2A:
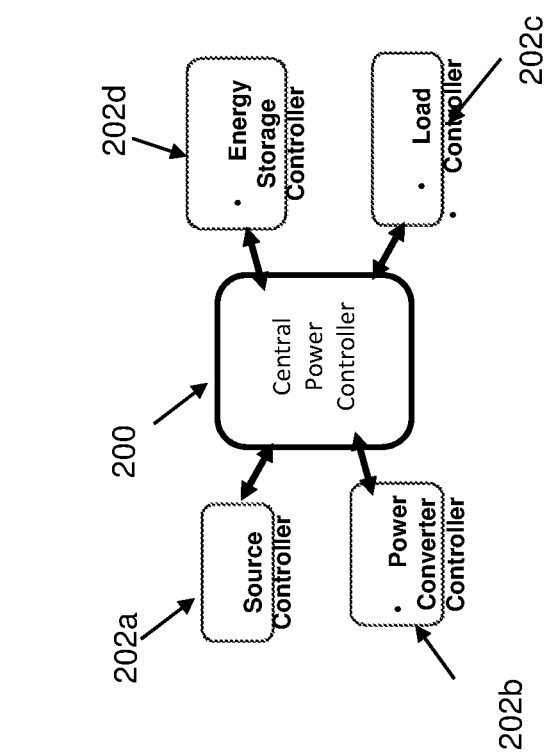

Turning now to FIG. 2A, a block diagram of a central power controller 200 is illustrated according to a non-limiting embodiment. The central power controller 200 is in bidirectional communication with one or more distributed controllers 202a, 202b, 202c, 202d, which are dedicated to perform a given power processing operation. The processing operations include, but are not limited to, power source generation, power conversion, energy storage, and load driving/control. Accordingly, the central power controller 200 can generate control signals to one or more distributed controllers 202a, 202b, 202c, 202d so as to facilitate various processes in a power system.

A diagram of the power architecture of the central power controller 200 is illustrated in FIG. 2B. The central power controller 200 includes a central controller level 210, a first intermediate level 212 (e.g., Level 1—Application 212), a second intermediate level 214 (Level 2—Control 214), and a lower level 216. The central controller level 210 includes an individual central controller that coordinates generation sources and loads to dynamically handle repeated pulse load demands from an arbitrary number of pulse loads. The central control level 210 (i.e., the central controller) can also output commands to various devices such as, for example, converters, loads, storage devices, and generators. The central controller installed at the central control level 210 can be viewed as a low-speed processor and also can enable reduction of system mass/volume through lower energy storage requirements.

The first intermediate level 212 includes a first intermediate controller, which can determine all local decisions independently of the central controller level 210. For example, the first intermediate level 212 provides local adaptive control autonomy. The first intermediate controller installed at the first intermediate level 212 can be viewed as an application level or medium speed processor and can be implemented using open architecture to maximize portability.

The second intermediate level 214 includes a second intermediate controller, which determines local subassembly decisions. The decisions executed at the second intermediate level controller facilitate control of one or more local subassembly components including, but not limited to, converter modules and circuits, individual energy storage modules, and load segments. The second intermediate controller installed at the second intermediate level 214 can be viewed as a high speed processor.

The lower level 216 can include the highest speed controller, and operates to control internal hardware of the subassemblies. In one or more embodiments, the lower level controller facilitates switching control and control over other various hardware layer components.

Figure 3:
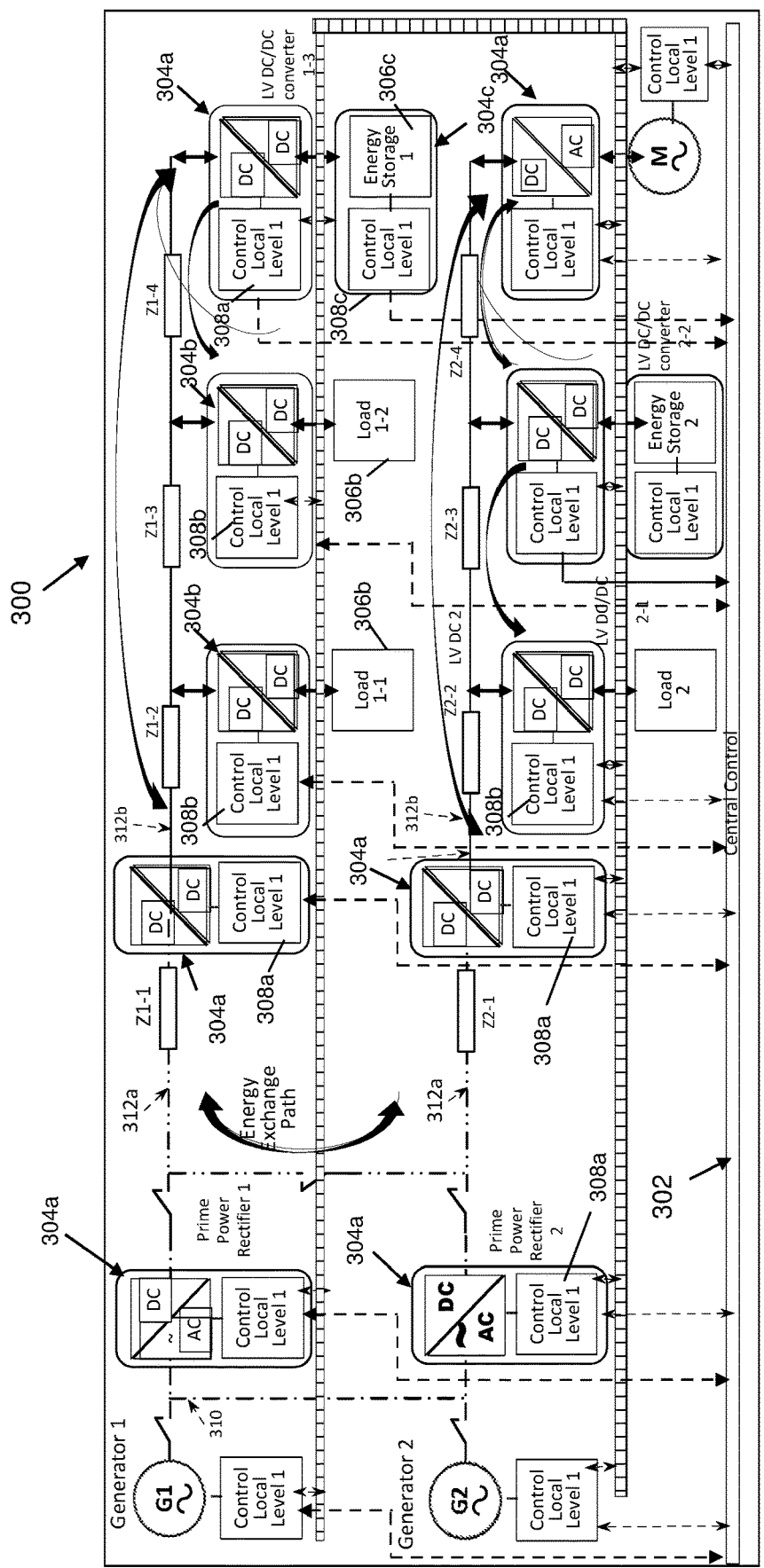
FIG. 3 is a shipboard power system diagram.

The adaptive stability control system 100 described herein can be implemented in various types of power systems. Turning to FIG. 3, for example, a block diagram of a sea vessel power system 300 capable of employing the adaptive stability control system 100 is illustrated according to a non-limiting embodiment. The shipboard power system 300 includes a central power controller 302 and several distributed smart converters 304a, 304b, and 304c. The central power controller 302 operates as described herein. For example, the central controller power controller 302 can coordinate generation sources and loads to dynamically handle repeated pulse load demands from an arbitrary number of pulse loads. The central power controller 302 can also output commands to control the operation of the distributed smart converters 304a, 304b, and 304c, e.g., AC/DC or DC/DC power conversion.

The distributed smart converters include, but are not limited to, distributed power converter modules 304a, distributed load modules 304b, and distributed energy storage modules 304c. The distributed power converter modules 304a can include AC/DC converter modules and DC/DC converter modules. The distributed load modules 304b include a local load element 306b. The distributed energy storage modules 304c include a local energy storage element 306c. Each of the distributed smart converters 304a, 304b, and 304c also include a locally distributed controller 308a, 308b and 308c. The distributed controllers 308a, 308b and 308c operate as described herein. For instance, the distributed controllers 308a, 308b and 308c can control power processing operation of a given module 304a, 304b and 304c. The processing operations include, but are not limited to, power source generation, power conversion, energy storage, and load driving/control.

The sea vessel power system further includes one or more AC buses 310 and a DC bus 312. The DC bus 312 can include one or more segments for handling different DC power levels. In at least one embodiment, for example, a first segment 312a (e.g., MV segment 312a) can be designed to distribute medium voltage DC (MVDC) power, while a second segment 312b (e.g., a LV segment 312b) can be designed to distribute low voltage DC (LVDC) power. Impedances (Z1-1 through Z2-4) of the bus segments 312a and 312b can influence the input and output impedances of the distributed converters 304a, 304b, and 304c. In one or more embodiments, the loads 306b draw pulsed power that may exceed the generator rating, and the distributed energy storage elements 306c provides pulsed power to alleviate the generator loading. In addition, the AC bus 310 and DC bus 312 enable bidirectional power flow to facilitate the power transfer under various operation scenarios. This allows the distributed smart converters 304a, 304b, 304c to continuously measure the impedance of the DC bus 312 (e.g., based on the DC bus voltage and the DC bus current) and execute at least one adaptive control algorithm to regulate the DC bus impedance, thereby maintaining stability of the bidirectional pulsed power flow and energy storage. Accordingly, the distributed smart converters 304a, 304b, and 304c can maintain stability of the DC bus 312 while also having the ability to operate independently of the central controller 302.

Figure 4:
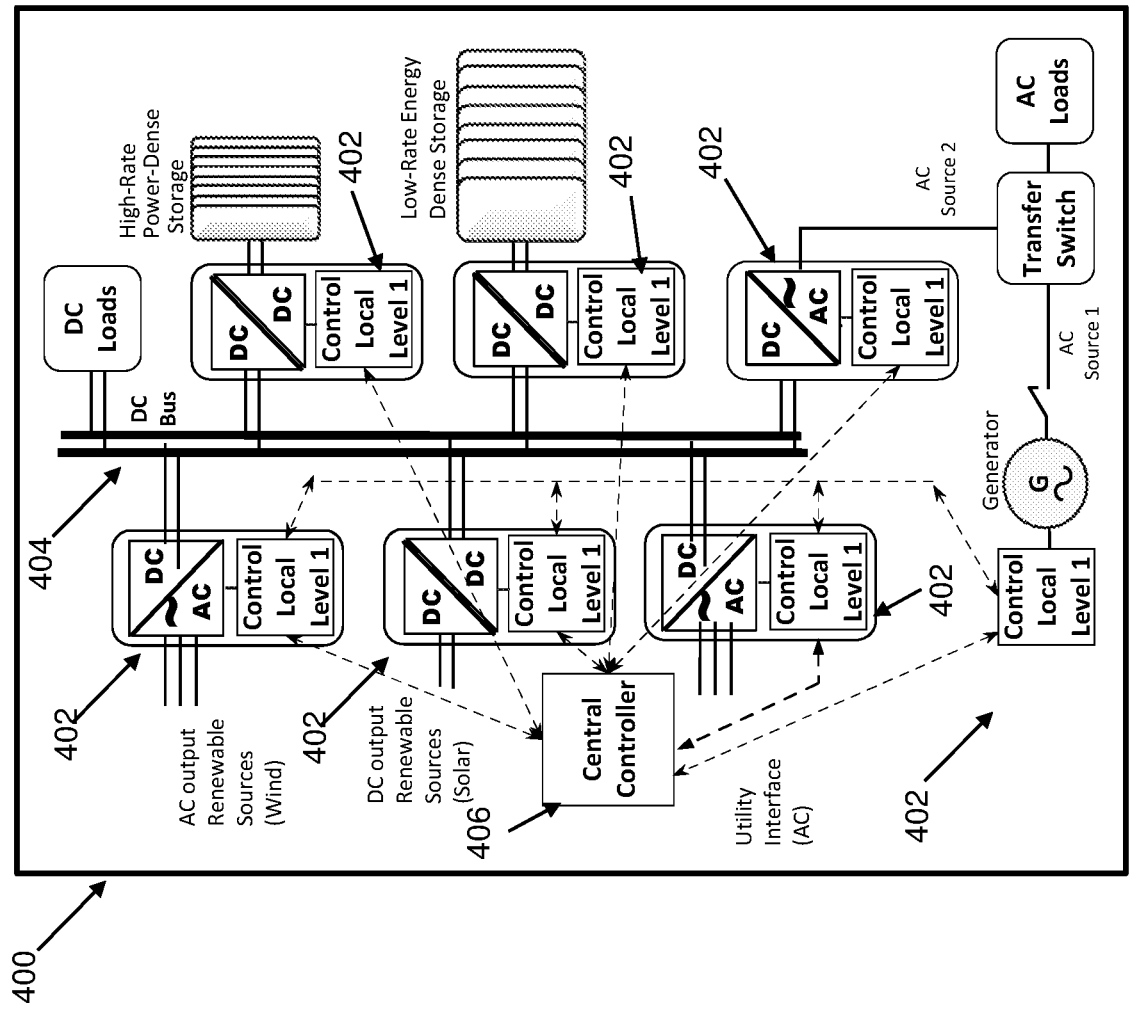
FIG. 4 illustrates a sea vessel power system including a micro-grid in signal communication with a direct current (DC) bus.

Turning to FIG. 4, a block diagram of a commercial micro-grid power system 400 capable of employing the adaptive stability control system 100 is illustrated according to a non-limiting embodiment. The micro-grid power system 400 includes a plurality of micro-grids or distributed smart converters 402 in signal communication with a direct current (DC) bus 404. The micro-grid power system 400 can be implemented as a Plug-and-power Micro-Grid with an intermediate DC bus 404 capable of operating according to any power source (e.g., AC power or DC power). The combination of a central power controller 406 and the distributed smart converters 402 provides power stability under all sources (AC sources and/or DC sources) and loads (e.g., DC loads and/or AC loads). For instance, the micro-grid power system 400 can be stabilized to provide seamless switchover from utility to islanded mode and source to source, to support hot-swapping, and supports scalabilty and connectivity for diverse facilities.

Figure 5:
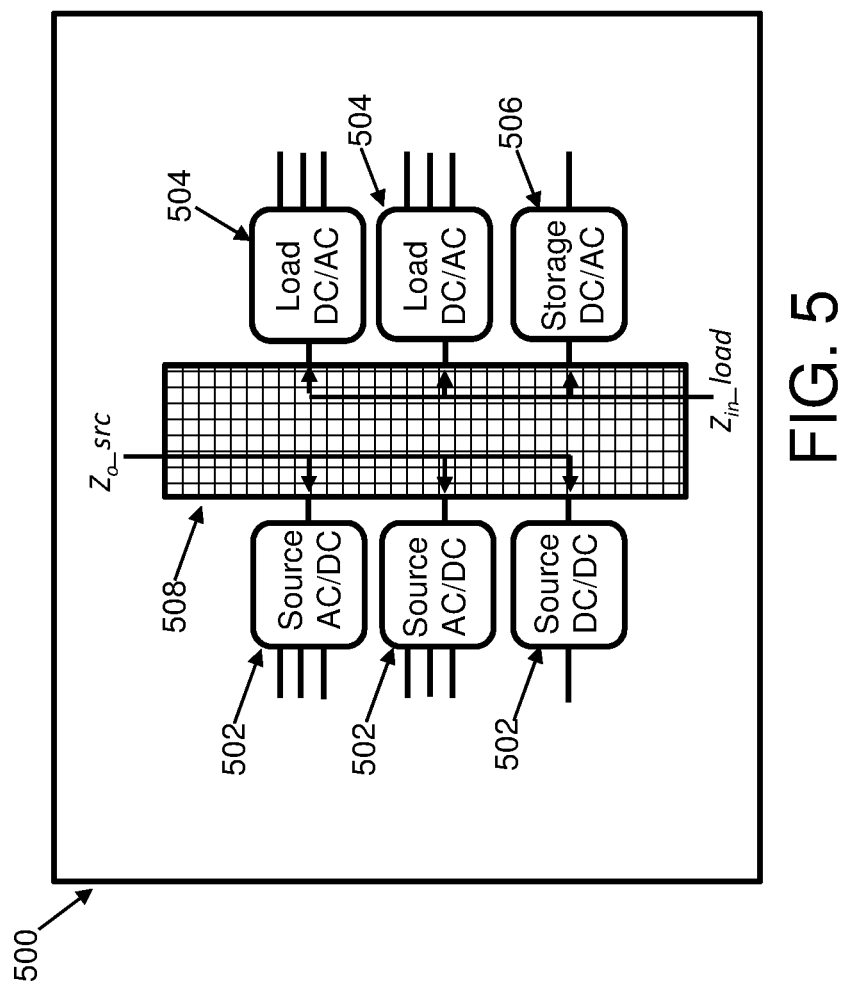
FIG. 5 is an adaptive stability control system according to a non-limiting embodiment.

Turning to FIG. 5, an adaptive stability control system 500 is illustrated in greater detail according to a non-limiting embodiment. The adaptive stability control system 500 includes a distributed power system with multiple sources 502, multiple loads 504, and one or more energy storage units 506 in signal communication with a DC bus 508. As described herein, the sources 502, loads 504 and energy storage units 506 can be implemented in distributed smart converters. Accordingly, the sources 502 can be constructed as bidirectional converters to provide AC/DC converted signals and/or DC/DC converted signals. In this manner, the bidirectional converters 502 allow for power flow to and from energy storage. The bidirectional converters 502 can also draw power from the DC bus 508 to the load or charge energy storage, and can maintain power continuity by delivering power back to the DC bus 508 when instantaneous loading exceeds available power.

A feedback control is also provided, and is reconfigured to modify both the transfer function of the load ($G_{load}$) and the effective loop gain (T) created by the interactions between the combined source impedances $Z_{o\_src}$ and load impedances $Z_{in\_load}$. The parameters of the feedback loop or the effect the feedback loop has upon the system can be adjusted by varying the source impedances $Z_{o\_src}$ and/or the load impedances $Z_{in\_load}$. Accordingly, the bidirectional converters can facilitate power system stability based on bidirectional pulsed power flow and energy storage under both scenarios. As described herein, the distributed bidirectional converters with energy storage can enable a robust control algorithm, which maintains stability of the bus while operating independently of the central controller.

The adaptive stability control system 500 can perform continuous online measurements of the bus impedance and apply adaptive control algorithms to regulate impedance of the DC bus and maintain stability. According to the direction of the energy flow, the locally distributed controllers included in the smart converters 502, 504 and 506 can effectively lower the equivalent source impedance at frequencies where source and load interactions may reduce stability margins. In at least one embodiment, the smart converters 502, 504 and 506 can deliver power drawn from the DC bus 508 to the load (e.g., coupled to smart converter 504) or to the energy storage element (e.g., coupled to smart converter 506) for charging. The smart converters 502, 504 and 506 can also inject energy from the storage elements into the DC bus 508 when instantaneous loading exceeds available power, and adjust parameters of the closed-loop feedback to maintain power continuity of the distributed power system.

The adaptive stability control system described herein performs continuous measurements of the DC bus impedance and applies adaptive control algorithms to regulate the DC bus impedance and maintain power stability. As described above, power can be selectively drawn from the DC bus and injected back to the DC bus based on the available power of the system and the impedance realized by the DC bus. To meet stability criteria under both scenarios requires a reconfiguration of the DC/DC converter feedback control law is utilized, which changes both $G_{loads}$ and T. For example, the overall small-signal transfer function from an input source to a load can be expressed as:

$$\frac{v_O}{v} = \frac{G_{src}G_{load}}{1+T},$$

$$\text{where } T = \frac{Z_{O_{src}}}{Z_{load}}$$

In the equation above, $G_{src}$ and $G_{load}$ are the individual forward transfer functions of the source and load converters and T represents an effective loop gain created by the interactions between the combined source impedances $Z_{o\_src}$ and load impedances $Z_{in\_load}$.

Referring again to FIG. 5, for example, a direction of the energy flow can be monitored. Based on the energy flow, the distributed smart converters 502, 504 and 506 can effectively lower the equivalent source impedance ($Z_{o\_src}$) at frequencies where source and load interactions may reduce stability margins. In at least one embodiment, $Z_{o\_src}$ can be lowered by injecting energy from one or more energy storage elements (e.g., coupled to smart converter 506) back into the DC bus 508, and adjusting parameters of the closed-loop feedback. Accordingly, implementing the distributed smart converters with integrated energy storage elements (e.g., smart converter 506) into the system can facilitate a robust energy-based power stabilizing control system.

Figure 6:
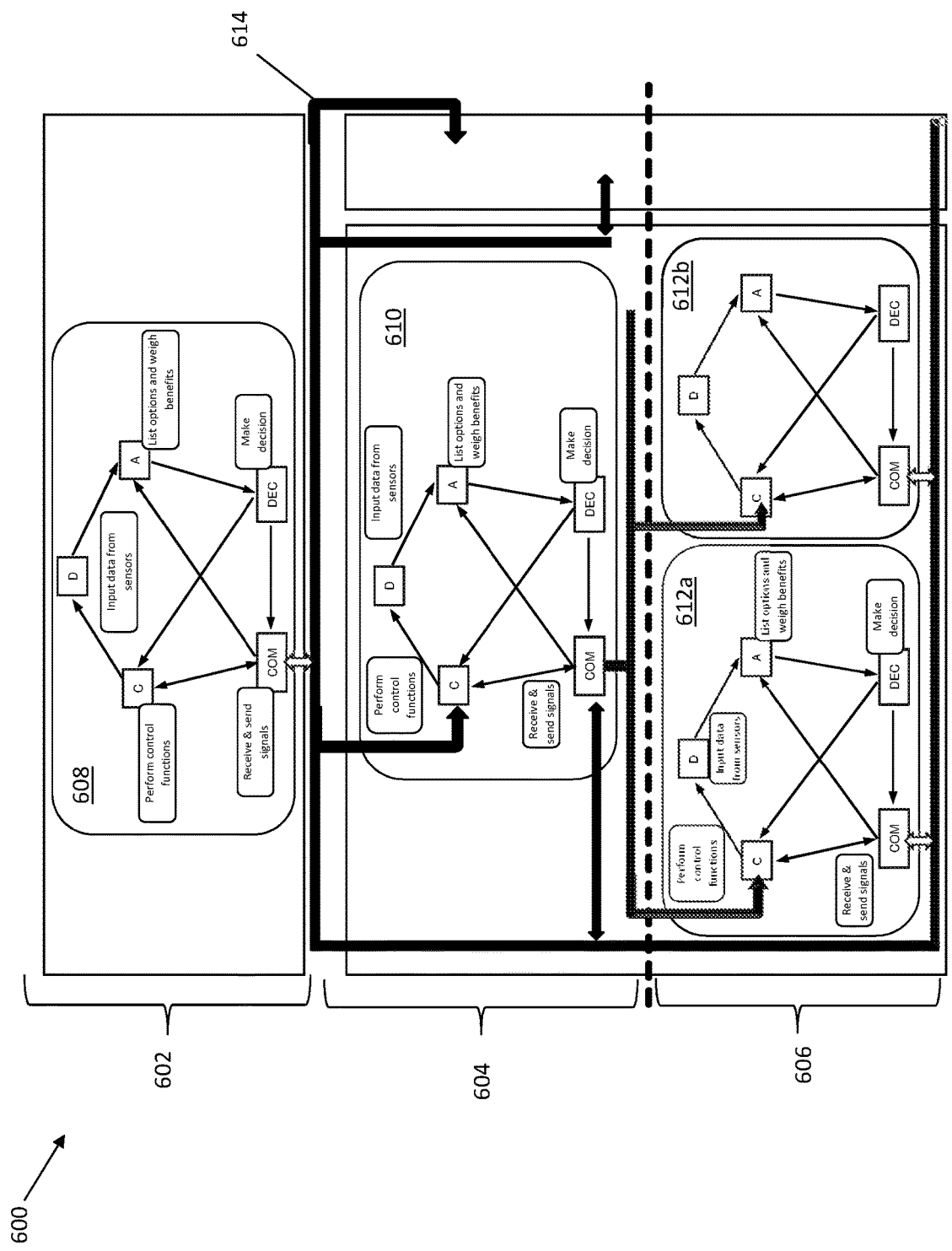
FIG. 6 illustrates the adaptive stability control system performing a decision decomposition operation.

With reference now to FIG. 6, an adaptive stability control system 600 is illustrated in greater detail according to a non-limiting embodiment. The adaptive stability control system 600 is established as a hierarchy of levels 602, 604, 606, where each level 602, 604, 606 includes one or more individual controllers 608, 610, 612a, 612b that perform decisions and one or more dedicated processing operations.

Each individual controller 608, 610, 612a, 612b can include individual sub-controllers, which operate as intelligent electronic logic units (also referred to as "agents") that provide basic and extended data processing capabilities. The individual controllers can monitor (e.g., self-diagnose) a feedback loop 614 and adjust its parameters to determine whether the compensation of the feedback loop is adequate for the operating conditions.

The hierarchical levels include a system level 602, a first converter level (Level 1 converter) 604, and a second converter submodule level (Level 2 converter submodules). The system level 602 (also referred to as a central level) includes a central power controller 608 and is configured to resolve conflicting demands.

The first converter level 604 includes a level-1 controller 610, which can be integrated with a power converter to establish a distributed smart converter as described herein. The level-1 controller 610 maintains stability and coordinates actions with other distributed smart converters employed in the adaptive stability control system. The level-1 controller 610 can also operate independently from the central power controller 608 and can operate at higher processing speeds than those executed at the central power controller 608.

The second converter submodule level 610 includes a first level-2 controller 612a and a second level-2 controller 612b. Both the first level-2 controller 612a and the second level-2 controller 612b can operate independently of the central power controller 608 and/or the level-1 controller 610 to monitor and predict local power needs. The first level-2 controller 612a and/or the second level-2 controller 612b can deliver a feedback signal 614 to the remaining controllers 608 and 610 that indicates the actively changing power requirements of DC bus. In at least one embodiment, the first level-2 controller 612a and/or the second level-2 controller 612b can monitor the feedback signal 614 and adjusts its parameters to provide a predicted impedance variation that compensates for a change in the power requirements and maintains the stability of the distributed power system.

As described above, each controller 608, 610, 612a and 612b (e.g., installed at a respective level) comprises multiple individual logic units (e.g., "agents") having delineated responsibilities. Specific control algorithms are assigned to each level 602, 604 and 606, which are executed by the respective processing units 608, 610, 612a and 612b implemented at the respective level. Signals between parallel (same level) and hierarchical activities tie together all processing units 608, 610, 612a and 612b. That is, each processing unit 608, 610, 612a and 612b is in signal communication with one another and can share data among each other. The shared data includes, for example, local power needs, measured DC bus impedance values (e.g., $Z_{o\_src}$, $Z_{in\_load}$), direction of the energy flow, etc.

Figure 7:
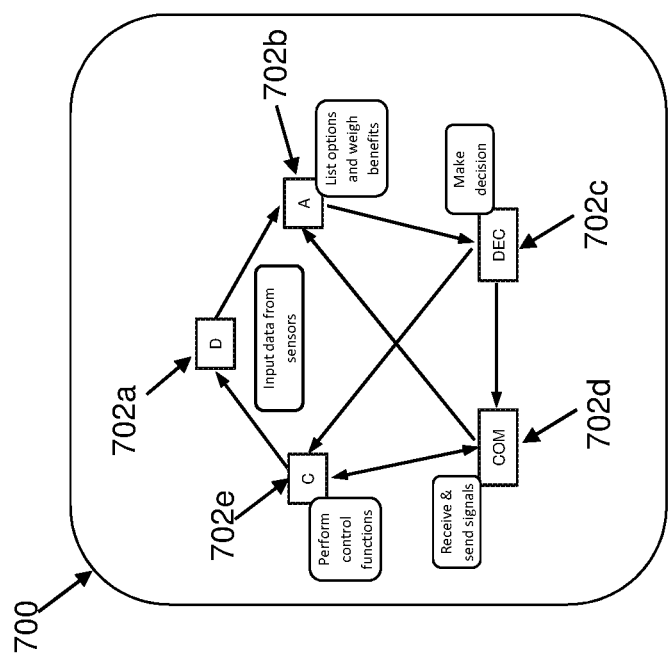
FIG. 7 illustrates an arranged connection of several intelligent electronic logic units (i.e., agents) implemented in a processing unit according to a non-limiting embodiment.

FIG. 7 illustrates a level controller 700 includes multiple intelligent electronic logic units (i.e., agents) 702a, 702b, 702c, 702d, and 702e according to a non-limiting embodiment. As described herein, any one of the logic units 702a, 702b, 702c, 702d, and 702e can be constructed as an electronic hardware controller that includes memory and a processor configured to execute algorithms and computer-readable program instructions stored in the memory. Each logic unit 702a, 702b, 702c, 702d, and 702e can be programmed to perform delineated responsibilities. In one or more embodiments, the logic units 702a, 702b, 702c, 702d, and 702e are capable of performing various operations including, but not limited to, data collection, data analysis, logic decisions, data communication, and signal control/routing.

For example, a data collection logic unit 702a can perform data collection operations that include, but are not limited to, performing online measurements of a bus waveforms (e.g., as a minimum, input and output voltages and input and output currents at the interface to the MVDC system), monitoring local energy level and condition of the energy storage elements, and monitoring condition of the power conversion hardware.

The data analysis logic unit 702b can perform data analysis operations that include, but are not limited to, determining whether the measured waveforms correspond to instability, detecting power transient or surge events, calculating values of input and output impedance, determining whether energy has to be injected into or drawn from the bus, calculating the total amount of energy and the desired time interval for injecting or withdrawing it, determining potential energy flow profiles as a function of time, calculating "ramp rate" (rate of change) of energy flow, and determining whether the local controller's feedback loop compensation is adequate for the operating conditions (self-diagnostics).

The logic decision unit 702c can perform various decisions and logic operations that include, but are not limited to, determining instability states (i.e., is the system stable or unstable), determining whether to inject or draw energy, selecting energy flow profile appropriate for operating conditions, and determining whether to re-compensate the local controller's feedback loop.

The data communication logic unit 702d can perform various data communication operations that include, but are not limited to, exchanging data between central controller and converters to communicate command signals to stop drawing energy from the bus or to inject energy to the bus, exchanging data between central controller and the converters to reschedule pulse loads, exchanging data from the central controller to the converters to shed loads for defined time intervals, and exchanging data from the PCM to central controller to determine the status of the bus and loads, energy injected, energy withdrawn, and/or to determine available resources.

The signal control logic unit 702e can perform various signal control/routing operation. The signal control/routing operations include, but are not limited to, injecting energy to the bus at defined current during specified time interval, stopping energy draw (i.e., energy removal) from the bus, and shaping the local controller's feedback loop.

Figure 8:
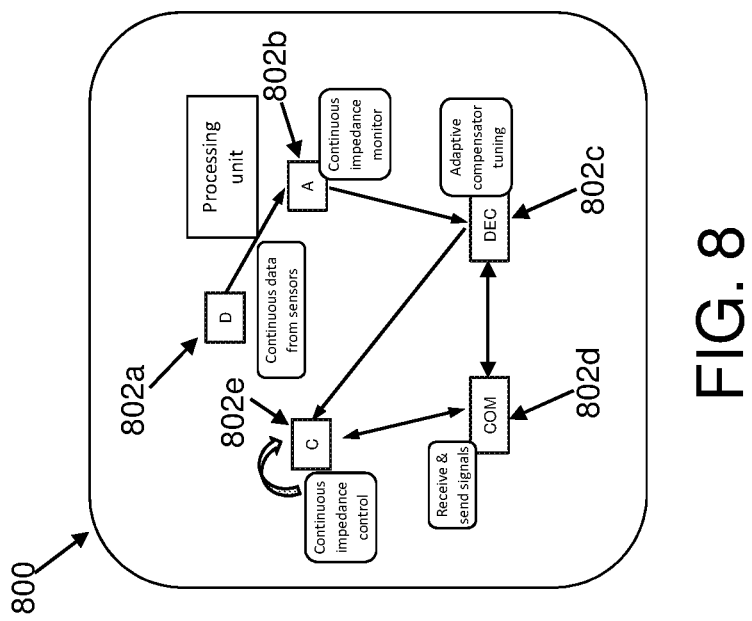
FIG. 8 illustrates an adaptive stability control system is illustrated according to another non-limiting embodiment.

Turning to FIG. 8, a level controller 800 including multiple intelligent electronic logic units (i.e., agents) 802a, 802b, 802c, 802d, and 802e is illustrated according to a non-limiting embodiment. The level controller 800 is similar to the system described above; however, it can be implemented as a level-1 controller integrated with an energy storage device and continuously regulate the local bus impedance (e.g., the DC bus impedance) using algorithms that are adaptive to current measured bus impedance data and. That is, the controller 800 can utilize a signal control logic unit 802e to perform a continuous adaptive impedance control to selectively draw energy from the local bus (e.g., DC bus) and deliver it to the energy storage device and inject energy from the energy storage device back into the local bus (e.g., DC bus) based on the impedance analysis determined by a data analysis logic unit 802b. In one or more embodiments, the energy draw/injection operation applies to both dedicated energy storage devices and loads integrated with a given level controller 800.

In at least one embodiment, distributed energy storage can be used to regulate the bus impedance as described herein. The operation is similar to droop control (also referred to as droop speed control) for managing priorities at DC, but is defined as impedance across frequency bands. The distributed energy storage operation effectively damps resonances caused by sources and loads and failures on the bus, which allows the first level controllers to source and sink energy in appropriate frequency bands. For example, power-dense storage may have lower impedance targets at higher frequencies, and energy dense storage may have lower impedance targets at lower frequencies. If one fails or saturates, the other will naturally take over at its respective impedance and state of charge limits.

The controller 800 can be implemented in a hierarchical adaptive stability control system as described herein (see e.g., FIG. 6). For example, the hierarchical adaptive stability control system can include a central controller, a first level (i.e., level 1) bidirectional energy storage controller, and a first level (i.e., level 1) bidirectional load controller. The central controller determines and communicates bus impedance regulation targets for distributed energy storage. The central controller also determines and communicates bus impedance regulation targets and power and ramp rate limits for loads that include local energy storage.

Figure 9:
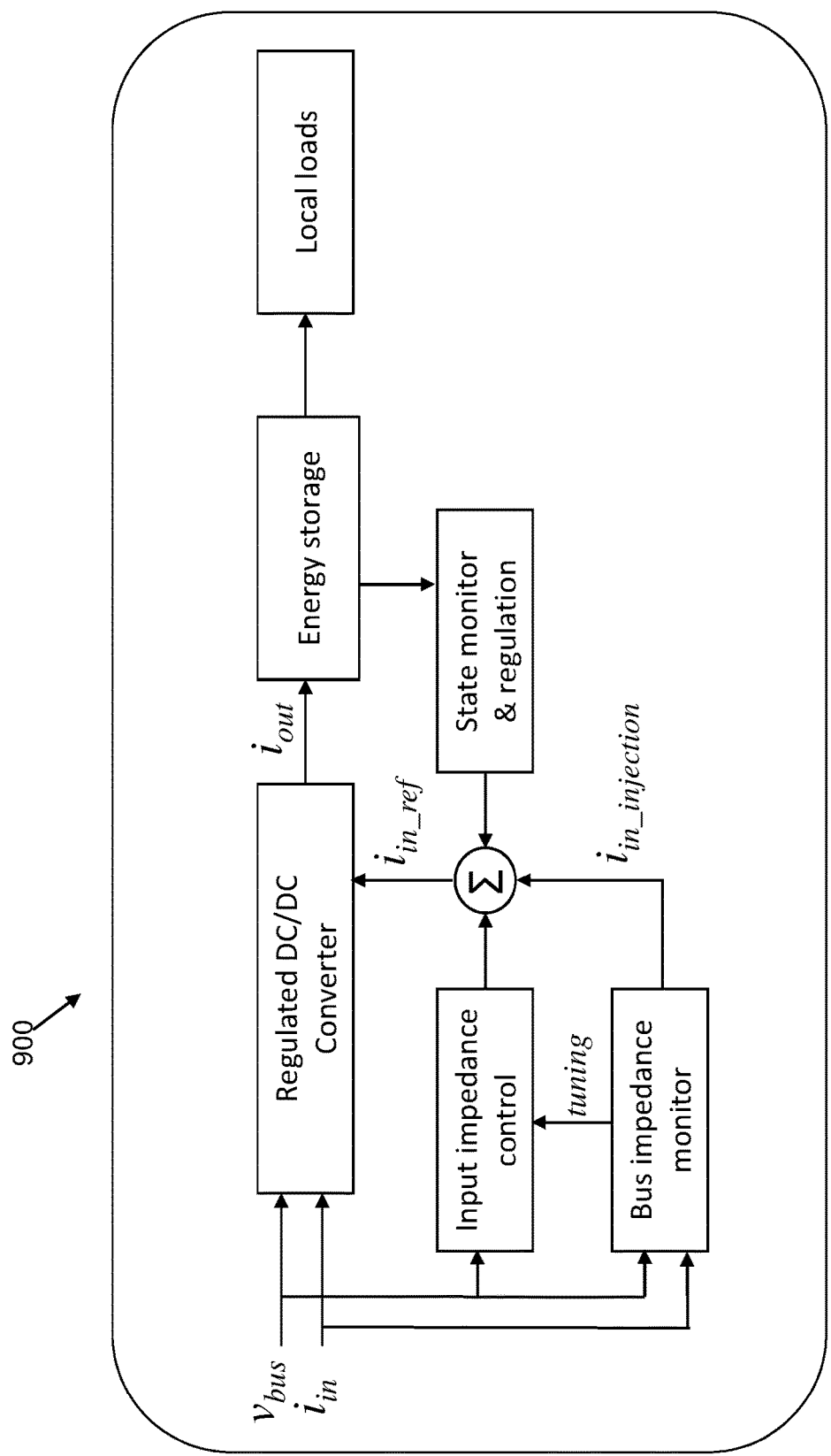
FIG. 9 is a block diagram illustrating an example of an adaptive bus impedance regulation control operation.

The first level (i.e., level 1) bidirectional energy storage controller can perform data communication operations, control operations, and data, analysis and decision operations. The communication operations include, but are not limited to, receiving impedance commands from the central controller reports bus impedance and communicating status information (available energy and power, and ability to meet impedance specifications) to central the controller. The control operations include, but are not limited to, continuously regulating the bus according to impedance specifications. The data, analysis and decision operations include continuously or periodically injecting signals into the bus to identify bus impedance and adaptively controlling the local feedback control loop to meet targets. A block diagram illustrating an example of an adaptive bus impedance regulation control operation 900 is illustrated in FIG. 9.

The first level (i.e., level 1) bidirectional load controller is capable of regulating the load with power and ramp rate limits, along with executing bus impedance regulation. The data control, data analysis and logic decision operations are performed similar to the energy storage controller described above. The data communication operations is performed as described above, but also includes the capability of communicating any load regulation limitations to central controller. In at least one embodiment, the central controller provides less stringent specifications on bus impedance to load controllers.

In at least one embodiment, the first level bidirectional load controller performs load regulation operations according to a predetermined load schedule when not limited by input impedance control. When, however, the bus specification is not met, priority is given to impedance control and load performance is limited.

Figure 10:
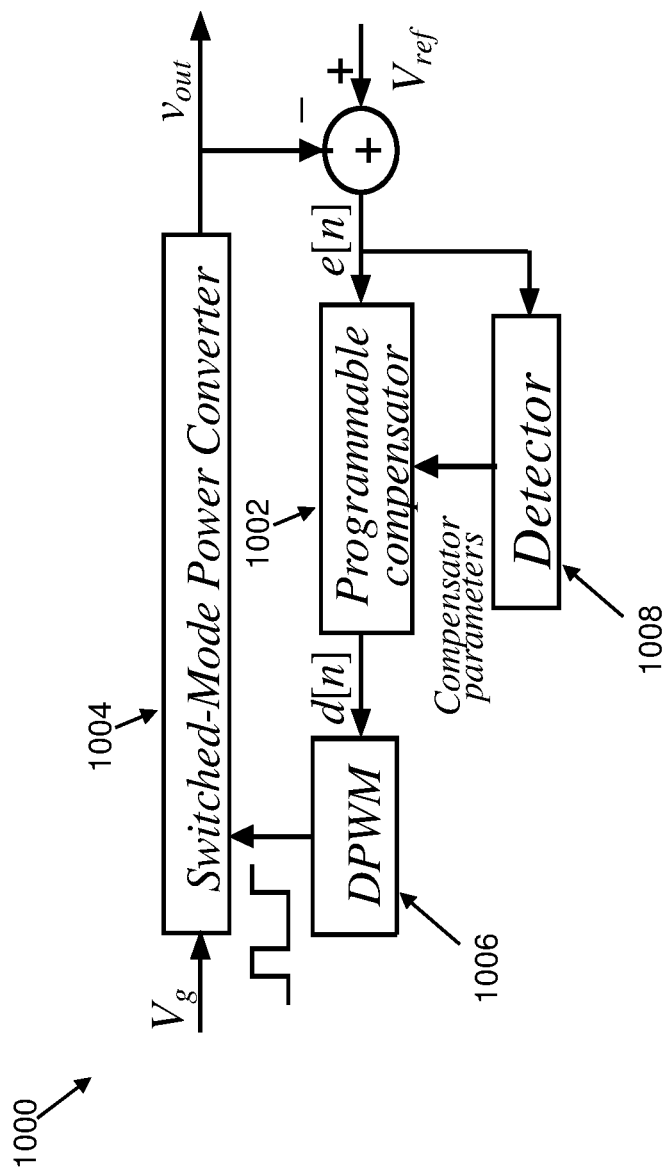
FIG. 10 illustrates an adaptive stability control circuit according to a non-limiting embodiment.

The adaptive stability control system is also capable of detecting instabilities and adaptively compensating for loads without energy storage. With reference to FIG. 10, the adaptive stability control system 1000 can actively control stabilization using online detection. For example, a programmable PID compensator 1002 can adaptively tune controller parameters to preserve stability. The stability operation can apply to loads that cannot directly damp instability with bidirectional energy injection. Local switched-mode power converters 1004 (e.g., DC-DC converters) can be driven by a digital pulse width modulation (DPWM) circuit 1006 based on the output of the compensator 1002 to limit bandwidth and reduce excitation of instability.

Figure 11:
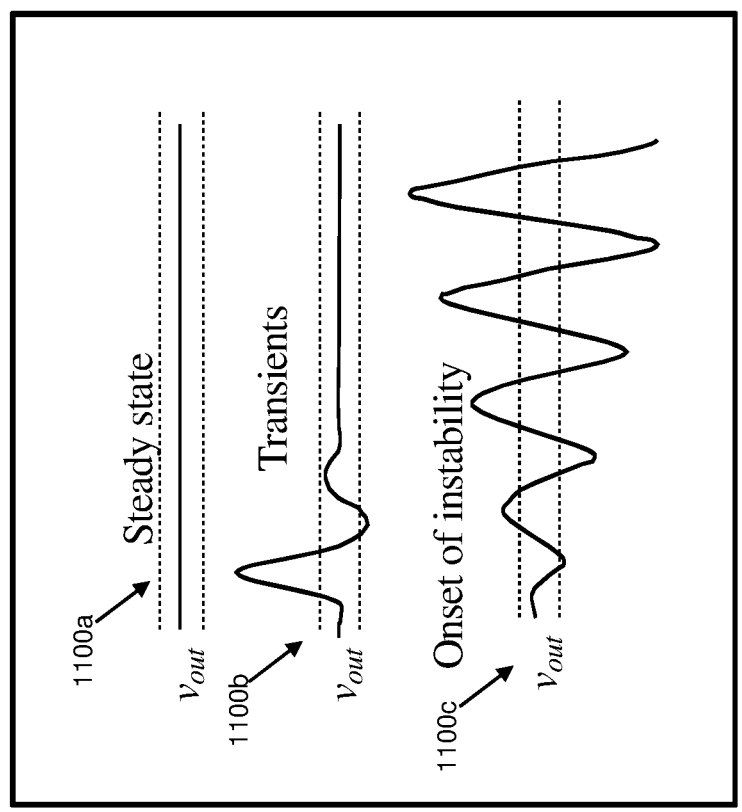
FIG. 11 illustrates various detected operating states capable of being detected by the adaptive stability control circuit illustrated in FIG. 10.

In at least one embodiment, a detector circuit 1008 is provided, which performs detection operations that include detection of steady-state conditions, transient conditions and/or instability conditions. The detection can be determined based on the measured waveforms 1100a, 1100b and 1100c generated by the steady-state conditions, transient conditions and/or instability conditions, respectively (see FIG. 11). The steady-state conditions 1100a can be identified as a condition where the output voltage is present in a regulation band. The transient condition 1100b can be identified as a condition where the output voltage returns to the regulation band quickly, e.g., based a time period threshold. For example, a transient event 1100b can be detected when the output voltage returns to the regulation band at or less than a detected time period. The instability condition 1100c can be identified as a condition where the output voltage deviates away from the regulation band.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. An adaptive stability control system comprising:
a direct current (DC) bus configured to provide bidirectional pulsed power flow and energy storage;
at least one load in signal communication with the DC bus; and
a plurality of distributed smart converters in signal communication with one another via the DC bus, each distributed smart converter configured to continuously measure an impedance of the DC bus and execute at least one adaptive control algorithm to regulate the impedance of the DC bus to maintain stability of the bidirectional pulsed power flow and energy storage,
wherein each of the distributed smart converters integrates at least one local controller and an energy storage device, the energy storage device in signal communication with the at least one local controller and in signal communication with the DC bus without direct connection the at least one load, and
wherein the at least one local controller regulates the impedance of the DC bus by:
selectively outputting the energy from the energy storage device to the DC bus such that the DC bus delivers the energy to the at least one load based on a frequency of the energy flow, and
drawing the energy from the DC bus and selectively delivering the energy to the energy storage device and the at least one load independently from the energy storage device based on the frequency of the energy flow.

2. The adaptive stability control system of claim 1, wherein the at least one local controller compares the measured impedance of the DC bus to a bus specification, performs load regulation in response to the measured impedance of the DC bus meeting the bus specification, and prioritizes the regulation of the impedance according to the adaptive control algorithm in response to the measured impedance of the DC bus not meeting the bus specification.

3. The adaptive stability control system of claim 1, wherein the plurality of distributed smart converters regulate the impedance of the DC bus by varying an equivalent source impedance of the DC bus.

4. The adaptive stability control system of claim 3, wherein the plurality of distributed smart converters vary the equivalent source impedance based on at least one or both of a direction of energy flow through the DC bus or the frequency of the energy flow.

5. The adaptive stability control system of claim 4, wherein the plurality of distributed smart converters control the direction of energy flow by selectively delivering energy to the DC bus and drawing energy from the DC bus.

6. The adaptive stability control system of claim 1, wherein the at least one local controller comprises a plurality of local controllers assembled according to a hierarchical architecture based on processing speed.

7. The adaptive stability control system of claim 6, wherein the plurality of local controllers comprise:
a first controller that operates at a first processing speed to monitor the DC bus and is configured to determine actively changing power requirements of the DC bus; and
a second controller that operates a second speed that is lower than the first speed, the second controller configured to control the direction of energy flow based on the power requirements provided by the first controller.

8. The adaptive stability control system of claim 7, wherein the first controller generates a feedback signal to the second controller that indicates the power requirements, and adjusts parameters of the feedback loop to provide a predicted impedance variation that compensates for a change in the power requirements.

9. A method of regulating power in a distributed power system, the method comprising:
delivering bidirectional pulsed power flow and energy storage to and from at least one distributed smart converter among a plurality of distributed smart converters in signal communication with one another via a direct current (DC) bus;
continuously measuring, via the at least one distributed smart converter, an impedance of the DC bus; and
executing, via the at least one distributed smart converter, at least one adaptive control algorithm to regulate the impedance of the DC bus to maintain stability of the bidirectional pulsed power flow and energy storage,
wherein regulating the impedance of the DC bus comprises:
selectively outputting the energy from the energy storage device to the DC bus such that the DC bus delivers the energy to at least one load connected thereto and in signal communication with the DC bus based on a frequency of the energy flow; and
drawing the energy from the DC bus and selectively delivering the energy to the energy storage device and the at least one load independently from the energy storage device based on the frequency of the energy flow.

10. The method of claim 9, wherein plurality of distributed smart converters are in signal communication with one another via the DC bus, and each distributed smart converter includes at least one local controller, the at least one local controller performing operations of:
comparing the measured impedance of the DC bus to a bus specification;
performing load regulation in response to the measured impedance of the DC bus meeting the bus specification; and
prioritizing the regulation of the impedance according to the adaptive control algorithm in response to the measured impedance of the DC bus not meeting the bus specification.

11. The method of claim 10, wherein the prioritizing includes varying an equivalent source impedance of the DC bus so as to regulate the impedance of the DC bus.

12. The method of claim 11, wherein varying the equivalent source impedance is based on one or both of a direction of energy flow through the DC bus or the frequency of the energy flow.

13. The method of claim 12, further comprising selectively delivering energy to the DC bus and drawing energy from the DC bus so as to control the direction of energy flow.

14. The method of claim 13, wherein the at least one local controller regulates the impedance of the DC bus by selectively outputting, from an energy storage device integrated with the at least one distributed smart converter, the energy to the DC bus and drawing the energy from the DC bus to the energy storage device based on the frequency of the energy flow.

15. The method of claim 14, wherein the at least one local controller comprises a plurality of local controllers assembled according to a hierarchical architecture based on processing speed.

16. The method of claim 15, wherein the plurality of local controllers comprise:

a first controller that operates at a first processing speed to monitor the DC bus and is configured to determine actively changing power requirements of the DC bus; and a second controller that operates a second speed that is lower than the first speed, the second controller configured to control the direction of energy flow based on the power requirements provided by the first controller.

17. The method of claim 16, further comprising:

generating, via the first controller, a feedback signal to the second controller that indicates the power requirements; and adjusting, via the first controller, parameters of the feedback loop to provide a predicted impedance variation that compensates for a change in the power requirements.

* * * * *